(12) United States Patent
Karasev et al.

(10) Patent No.: US 11,776,135 B2
(45) Date of Patent: **\*Oct. 3, 2023**

(54) OBJECT VELOCITY FROM IMAGES

(71) Applicant: Zoox, Inc., Foster City, CA (US)

(72) Inventors: Vasiliy Karasev, San Francisco, CA (US); Sarah Tariq, Palo Alto, CA (US)

(73) Assignee: Zoox, Inc., Foster City, CA (US)

( \* ) Notice: Subject to any disclaimer, the term of this patent is extended or adjusted under 35 U.S.C. 154(b) by 430 days.

This patent is subject to a terminal disclaimer.

(21) Appl. No.: 16/949,554

(22) Filed: Nov. 3, 2020

(65) Prior Publication Data

US 2021/0049778 A1    Feb. 18, 2021

Related U.S. Application Data

(63) Continuation of application No. 16/408,195, filed on May 9, 2019, now Pat. No. 10,832,418.

(51) Int. Cl.
| | |
|---|---|
| *G06K 9/00* | (2022.01) |
| *G06T 7/246* | (2017.01) |
| *G06T 7/262* | (2017.01) |
| *G06T 7/50* | (2017.01) |
| *G06T 3/00* | (2006.01) |
| *G06V 20/58* | (2022.01) |
| *G06V 10/764* | (2022.01) |
| *G06V 10/42* | (2022.01) |
| *G06V 10/46* | (2022.01) |

(52) U.S. Cl.
CPC ............ *G06T 7/246* (2017.01); *G06T 3/0068* (2013.01); *G06T 7/262* (2017.01); *G06T 7/50* (2017.01); *G06V 10/42* (2022.01); *G06V 10/764* (2022.01); *G06V 20/58* (2022.01);

*G06T 2207/10016* (2013.01); *G06T 2207/20081* (2013.01); *G06T 2207/30261* (2013.01); *G06V 10/462* (2022.01)

(58) Field of Classification Search
None
See application file for complete search history.

(56) References Cited

U.S. PATENT DOCUMENTS

| | | | |
|---|---|---|---|
| 10,832,418 B1\* | 11/2020 | Karasev | ............. G06T 7/246 |
| 2018/0348249 A1 | 12/2018 | Kawamoto et al. | |
| 2019/0164295 A1\* | 5/2019 | Kim | ............. G06V 40/20 |
| 2020/0250837 A1\* | 8/2020 | Fagg | ............. G06F 18/253 |

OTHER PUBLICATIONS

Non Final Office Action dated Aug. 7, 2020 for U.S. Appl. No. 16/408,195, "Object Velocity From Images", Karasev, 6 pages.

\* cited by examiner

*Primary Examiner* — Soo Jin Park
(74) *Attorney, Agent, or Firm* — Lee & Hayes, P.C.

(57) ABSTRACT

Techniques are discussed for determining a velocity of an object in an environment from a sequence of images (e.g., two or more). A first image of the sequence is transformed to align the object with an image center. Additional images in the sequence are transformed by the same amount to form a sequence of transformed images. Such sequence is input into a machine learned model trained to output a scaled velocity of the object (a relative object velocity (ROV)) according to the transformed coordinate system. The ROV is then converted to the camera coordinate system by applying an inverse of the transformation. Using a depth associated with the object and the ROV of the object in the camera coordinate frame, an actual velocity of the object in the environment is determined relative to the camera.

20 Claims, 6 Drawing Sheets

OBJECT VELOCITY FROM IMAGES

CROSS-REFERENCE TO RELATED APPLICATION(S)

This application is a continuation of and claims priority to U.S. application Ser. No. 16/408,195, filed on May 9, 2019 and entitled "OBJECT VELOCITY FROM IMAGES," issuing on Nov. 10, 2020 as U.S. Pat. No. 10,832,418 the entirety of which is incorporated herein by reference.

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information, such as images, of surrounding persons and objects, which may be used by the autonomous vehicle to make decisions on how to traverse an environment. Accurately determining locations and/or velocities of persons and objects surrounding an autonomous vehicle from images may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
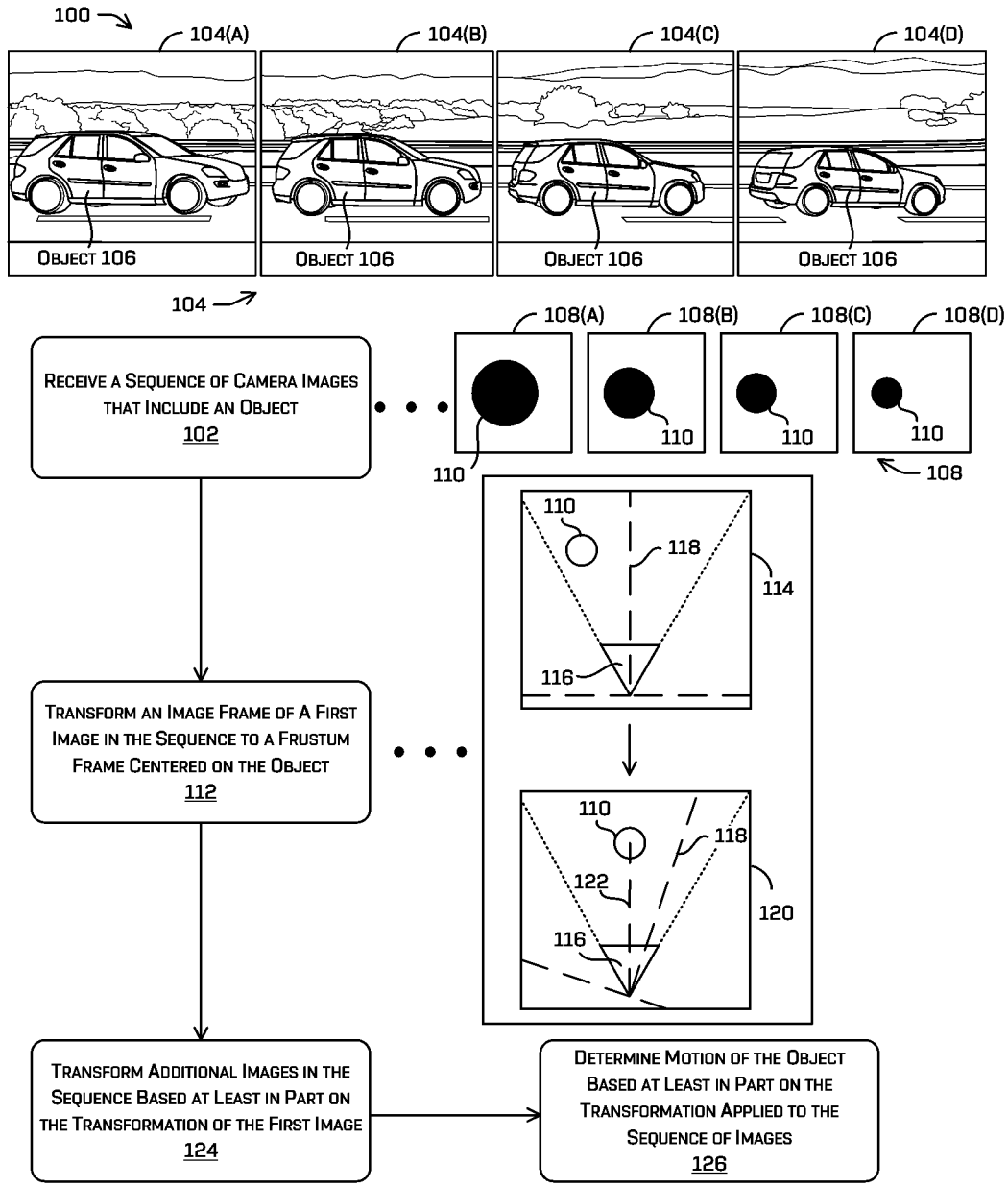
FIG. 1 is a pictorial flow diagram of receiving a sequence of camera images that include an object, and determining motion (e.g., velocity) of the object by applying a transformation to the sequence of camera images, in accordance with examples of the disclosure.

This disclosure is directed to estimating or determining a velocity of an object in an environment from a sequence of images (e.g., two or more) obtained from a camera. In some examples, the velocity of the object may be determined from images obtained from a single camera without relying on multiple cameras to determine depth and/or velocity, thus improving functioning of a computing device by reducing the number of images to be processed and/or enabling the computing device to determine velocity of objects that are captured by a single camera. Further, the techniques provided herein may make such determinations of velocity using at a single instant in time (e.g., without the need to perform tracking of an object over time to determine velocity). Additionally, the described techniques may be used to reliably determine a velocity of an object at distances where other techniques such as lidar may be less accurate, and/or in directions where other techniques such as radar may be less accurate. Thus, in some examples, the techniques described herein may supplement other velocity measurement systems. The determined velocity of an object may be used by a vehicle (e.g., an autonomous vehicle) in decision making processes to traverse an environment, and may in some examples be used in addition to information from a variety of sensors of the vehicle to control the vehicle to traverse the environment.

Sensor data captured by the vehicle can include lidar data, radar data, image data, time of flight data, sonar data, and the like. In some cases, the sensor data can be provided to a perception system configured to determine a type of an object (e.g., vehicle, pedestrian, bicycle, motorcycle, animal, parked car, tree, building, and the like) in the environment.

For instance, the sensor data may be captured by the vehicle as the vehicle traverses an environment. In some examples, the vehicle may include one or more cameras configured to capture sequences of images (e.g., individual images and/or video) of the surrounding environment. The sequences of images may be used by the vehicle to determine velocity of objects depicted in the images. In some examples, a sequence of images used to determine velocity according to the technique described herein may be as few as two images, but may also include more images (e.g., 3 images, 5 images, 10 images, 100 images, etc.). Additionally, in some cases, images may be selected from a larger group of images at an interval, such as every third frame (and/or every fifth frame, every tenth frame, etc.) of a video, every 300 milliseconds (and/or every 500 milliseconds, every second, every 5 seconds, etc.), and so forth. Information regarding an object captured in the sequence of images may be relevant to making decisions on how to control the vehicle as the vehicle traverses the environment, such as a distance of the object from the vehicle and a speed at which the object is moving. For example, information on a speed and direction that another vehicle and/or pedestrian is traveling may factor in to a speed of the vehicle, a stop position of the vehicle, a route that the vehicle follows, and so forth.

In some examples, a velocity component may detect one or more objects in a first image of the sequence of images. The velocity component may utilize object recognition techniques, such as pose clustering, scale-invariant feature transform (SIFT), speeded up robust features (SURF), deep learning techniques (including convolutional neural networks) or other object recognition techniques to identify objects in the sequence of images. The velocity component may in some examples crop the image surrounding each identified object, and/or generate a bounding box to overlay on each image in the sequence of images around the object.

The velocity component may then determine a transformation to apply to the sequence of images to align an image frame of a first image in the sequence to a frustum frame centered on the object. In some examples, the velocity component may transform the first image of the sequence by rotating a virtual pose of the camera such that the object aligns with an image center (e.g., center a view frustum of the camera). In at least some examples, such a transformation may be dependent on one or more of extrinsics and/or intrinsics associated with the camera (e.g., an image sensor). The velocity component may then transform the additional image(s) in the sequence in a similar fashion (e.g., in accordance with the same transformation), such as by rotating the additional image(s) by the same amount that the first image was rotated. The resulting sequence of transformed images indicates how the object moves in a transformed space (or transformed coordinate plane) relative to a center in image space.

The velocity component may use the location of the object in the transformed images to determine a relative object velocity (ROV) of the object in the transformed space. For example, the ROV of the object in the transformed space may correspond to a distance traveled by the object in the transformed space over an amount of time between the first image and the additional image(s) in the sequence. In at least some examples, the ROV in the transformed space may be determined by inputting the transformed sequence into a machine learned model trained to output the ROV based on the sequence of transformed input images. The ROV of the object in the transformed space may also be based on points in the image plane, as the distance of the object from the vehicle in the environment may be unknown. In such an example, only a scale of velocity in the image plane may be determined. The ROV of the object in the transformed space may be used to determine a ROV of the object in the camera coordinate frame, such as by reversing the rotation that was applied to center the object in the image (e.g., view frustum of the camera).

In some examples, the velocity component may receive a depth measurement of the object in the environment from a perception system of the vehicle, which may be used to determine motion of the object in the environment. For instance, contact points associated with where the object contacts the ground as applied to map data may be used to determine a depth of the object, a change in the size of the object in the sequence of images may be used to determine a depth of the object, a known size of a feature of the object may be used to determine the depth of the object (e.g., a wheelbase of a vehicle, a head size of a pedestrian, etc.), information received from lidar and/or radar may be used to determine a depth of the object, and so forth. Additional information for using contact points to determine a depth of an object can be found in U.S. patent application Ser. No. 15/814,870, which is incorporated by reference herein in its entirety. Using the depth of the object and the ROV of the object in the camera coordinate frame, the velocity component can determine an actual velocity of the object in the environment, e.g., in units such as meters per second, miles per hour, etc. (e.g., by scaling the velocity determined in the image plane based on the depth). The actual velocity of the object may include a magnitude of a particular direction that the object is traveling, based on the ROV of the object in the camera coordinate frame. In some examples, a velocity of the vehicle at the time that the sequence of images was captured may be applied to the actual velocity of the object to account for the vehicle's motion in the above calculations.

The techniques discussed herein can improve a functioning of a computing device in a number of ways. As mentioned above, the velocity component may use as few as two images from a single camera to make reliable velocity estimates of objects in the environment surrounding a vehicle. Consequently, significantly less processing resources are used in comparison to conventional techniques that require complex image analysis algorithms applied to sequences of many images to determine the velocity of an object. Since the velocity determination can be made from images of a single camera, the velocity component may be able to determine velocities for more objects in the environment than would be possible if images from multiple cameras were required. In some cases, the described techniques are more accurate than other velocity detection mechanisms. For example, lidar systems have range limitations on accurate velocity measurements, such as over a distance of 100 meters from the lidar system. Additionally, radar has limitations in detecting motion in two dimensions and/or perpendicularly to a Doppler signal output by a radar emitter, such as when an object's motion directly towards or away from the camera is constant, but instead is moving in at least one other direction (e.g., horizontally). By controlling the vehicle based in part on velocity of objects determined from image data, the safety of the vehicle can be improved by determining object velocities faster and earlier, thus allowing the vehicle to make trajectory decisions earlier. Additionally as just described, controlling the vehicle based in part on determining object velocity from images can reduce processing resources, with as few as two images being evaluated by the processing resources at one time during the velocity determination. Further, techniques for controlling the vehicle based in part on determining object velocity from images can increase a confidence that the vehicle can avoid collisions with oncoming traffic and/or pedestrians by determining the velocities earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of receiving a sequence of camera images that include an object, and determining motion of the object by applying a transformation to the sequence of camera images, in accordance with examples of the disclosure.

An operation 102 includes receiving a sequence of camera images that include an object. For example, a camera of a vehicle may capture a sequence of camera images 104 that includes individual images 104(A), 104(B), 104(C), and 104(D). Each of the individual images 104(A), 104(B), 104(C), and 104(D) includes an object 106. The individual images 104(A), 104(B), 104(C), and 104(D) may correspond to different points in time, and as time progresses, the object 106 moves through the environment captured by the camera.

A sequence of representations 108 corresponding to the sequence of camera images 104 includes individual representations 108(A), 108(B), 108(C), and 108(D), corresponding to the individual images 104(A), 104(B), 104(C), and 104(D). The individual representations 108(A), 108(B), 108 (C), and 108(D) each includes an object representation 110, which may correspond to the object 106 as the object 106 moves through the environment. The object representation 110 depicted in the individual representations 108(A), 108 (B), 108(C), and 108(D) may correspond to a bounding box which may overlay the individual images 104(A), 104(B), 104(C), and 104(D) and outline the object 106, although in this example circles are used for ease of comprehension. The representation 108 may include a change in size of the object representation 110 between the individual representations 108(A), 108(B), 108(C), and 108(D), which may correspond to the object moving away from or towards the camera that captured the sequence of images 104. Alternatively or additionally, the representation 108 may include a change in a location within an image plane by the object representation 110 between the individual representations 108(A), 108(B), 108(C), and 108(D), which may correspond to the object moving in a horizontal direction (left or right) relative to the camera that captured the sequence of images 104.

An operation 112 includes transforming an image frame of a first image in the sequence to a frustum frame centered on the object. For example, a top-down view 114 depicts the object representation 110 along with a representation of a camera 116, which may be located on a vehicle traversing the environment and used to capture the sequence of camera images 104. A camera coordinate frame 118 is shown, which may initially be centered on an optical center of the camera 116. The top-down view 114 may correspond to the first individual representation 108(A). The velocity component transforms the first individual representation 108(A) by rotating the camera coordinate frame 118 to align a center of the object representation 110 with a center of a view frustum of the camera 116. The velocity component may also crop and/or resize the image to correspond to a size of the object 106, such as based on a bounding box surrounding the object 106, cropping to provide additional portions of the image surrounding the bounding box, based on a set crop size (e.g., a number of pixels in height and width), and so forth. A top-down view 120, for instance, shows how the camera coordinate frame 118 is transformed (e.g., rotated), resulting in the center of the object representation 110 aligned with an axis 122 extending from the optical center of the camera 116.

An operation 124 includes transforming additional images in the sequence based at least in part on the transformation of the first image. In at least some examples, such a transformation may comprise one or more of a change in orientation (in any one or more of a roll, pitch, or yaw direction) and/or a translation (in any one or more of an x-, y-, or z-direction) with respect to the extrinsics of the image sensor which originally captured the image. In at least some examples, intrinsics (which may include lens distortion models) may be used when determining such transformed images. In the depicted example of the top-down views 114 and 120, a rotation is applied to the first individual representation 108(A) by rotating the camera coordinate frame 118 to align the center of the object representation 110 with the center of a view frustum of the camera 116. Therefore, the same rotation applied to the first individual representation 108(A) is applied to the remaining individual representations 108(B), 108(C), and 108(D), resulting in a sequence of transformed images in a transformed space created by the rotation of individual images.

An operation 126 includes determining motion of the object based at least in part on the transformation applied to the sequence of images. In some examples, the sequence of transformed images is input into a machine learned model trained to determine a relative object velocity (ROV) in a frustum coordinate frame, which may correspond to how the object moves in the image plane of the transformed sequence of images. For instance, the machine learned model may output a change in x-, y-, and/or z-directional components of the image plane, indicating how the object representation 110 has moved in the transformed space. Additional details regarding the machine learned model are discussed below in relation to FIG. 2. Once the velocity component has received the ROV of the object in the transformed space from the machine learned model, the velocity component may apply an inverse operation of the transformation described above to determine a ROV of the object representation 110 in the camera coordinate frame 118 (e.g., reversing the rotation applied to the top-down view 114 to obtain the top-down view 120).

In some examples, the operation 126 may include receiving a depth of the object 106 in the environment. The depth of the object 106 may be determined based at least in part on at least one of a known size of a feature of the object 106 used as a reference feature (e.g., a wheelbase of a vehicle, a head size of a pedestrian, etc.), information received from lidar and/or radar regarding a depth of the object 106, projecting features (e.g., wheel contact points) onto a known three-dimensional map, and so forth. Using the depth of the object and the ROV of the object in the camera coordinate frame associated with the sequence of camera images 104, the velocity component can determine an actual velocity of the object 106 in the environment relative to a vehicle, e.g., in units such as meters per second, miles per hour, etc. The actual velocity of the object 106 may include a magnitude in each of the directions in the camera coordinate plane that the object is traveling. In some examples, the camera 116 may be positioned on a vehicle (e.g., an autonomous vehicle) that is moving while the sequence of camera images 104 is captured. Therefore, a velocity of the vehicle at the time that the sequence of camera images 104 was captured may be applied to the actual velocity of the object to account for the vehicle's motion in the above calculations.

Figure 2:
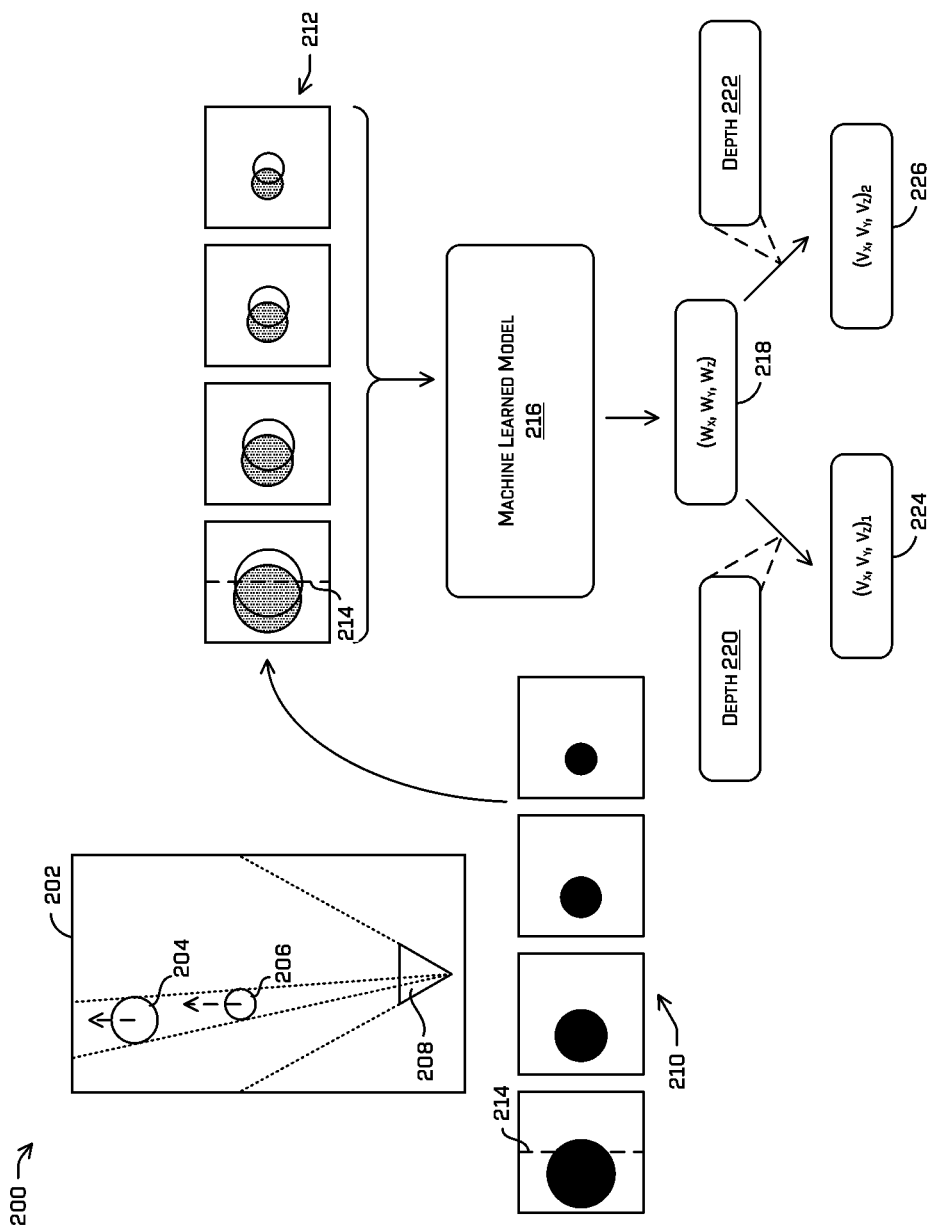
FIG. 2 is a schematic illustration of input images that may be input into a machine-learned model to determine object velocities at different depths which appear similar in input images, in accordance with examples of the disclosure.

FIG. 2 is a schematic illustration 200 of input images that may be input into a machine-learned model to determine object velocities at different depths which appear similar in input images, in accordance with examples of the disclosure.

An example environment 202 includes a first object 204 and a second object 206, along with a camera 208 which may be used to capture images of the example environment 202. The first object 204 may be larger than the second object 206. Additionally, the first object 204 may be a further distance away from the camera 208. In some examples, if the first object 204 and the second object 206 are moving in a similar direction (e.g., away from the camera 208), it may be difficult to distinguish velocities of the first object 204 and the second object 206 in the images captured by the camera 208. For example, consider a sequence of images 210, which may result from the camera 208 capturing images of either the first object 204 or the second object 206. Without further analysis, the motion of the first object 204 and the motion of the second object 206 in the sequence of images 210 may be indistinguishable (e.g., may appear the same), despite the first object 204 being larger, further away from the camera 208, and moving at a different velocity than the second object 206. However, by transforming the sequence of images 210 based on a rotation of a first image to align with an image center and applying a depth of the object as described herein, differences in the velocities of the objects may be determined without additional inputs by another camera.

For example, the sequence of images 210 may be transformed according to the techniques described herein from a camera coordinate frame to a frustum coordinate frame that centers the object onto a view frustum of the camera 208. A sequence of transformed images 212 may correspond to how the sequence of images 210 are transformed (e.g., rotated) to center the object to the view frustum of the camera 208. A dashed line 214 shown in a first image of the sequence of camera images 210 and shown in the first image of the sequence of transformed images 212 may correspond to a center of the view frustum of the camera 208, for instance. The sequence of transformed images 212 depicts the object position in the original sequence of images 210 as being shaded, and the object position in the sequence of transformed images 212 unshaded and overlaid on the position of the object in the original sequence. The images in the sequence of transformed images 212 that follow the first image may have a same transformation that was applied to the first image in the sequence to center the object in the view frustum of the camera 208. In some examples, the images in the sequence of transformed images 212 that follow the first image may not be centered on the view frustum of the camera, due to the position of the object changing while the same transformation that was applied to the first image is applied.

The sequence of transformed images 212 may be input into a machine learned model 216 trained to determine ROV of objects in an image plane. In some cases, images that are used to train the machine learned model 216 may be transformed images, where at least one of the transformed images are centered to a view frustum of a camera. In some examples, the machine learned model 216 may be a supervised model trained using image data labeled with objects and ROV of the objects in an image plane. Alternatively or additionally, the machine learned model 216 may be an unsupervised model, which may cluster image sequences having similar objects and/or ROV for the objects. In any case, the machine learned model 216 associates input images, such as the transformed images 212, with a velocity in an image plane, which may be independent of depth of the object from the camera. By providing the machine learned model 216 with image sequences having an image centered on a view frustum of the camera, the inputs to the model are simplified and thus fewer processing resources are used to determine ROV of objects in the images by the machine learned model 216.

In examples, the machine learned model 216 outputs a ROV 218, which may include x-, y-, and/or z-components representative of object motion in the image plane. The ROV 218 may then be combined (e.g., multiplied) by a depth 220 of the first object 204 and/or a depth 222 of the second object 206 to determine a ROV 224 of the first object 204 and a ROV 226 of the second object 206 in the environment, respectively. As noted elsewhere herein, the depth 220 and/or the depth 222 may be determined using a variety of techniques, such as lidar data, known object dimensions, contact points of the object with the ground corresponding to known locations on a map, and so forth. Therefore, although the sequence of images 210 may not distinguish velocity of the first object 204 from velocity of the second object 206, the techniques described herein provide accurate velocity determinations of objects without the need for a second camera to capture images of the objects 204 and 206.

Figure 3:
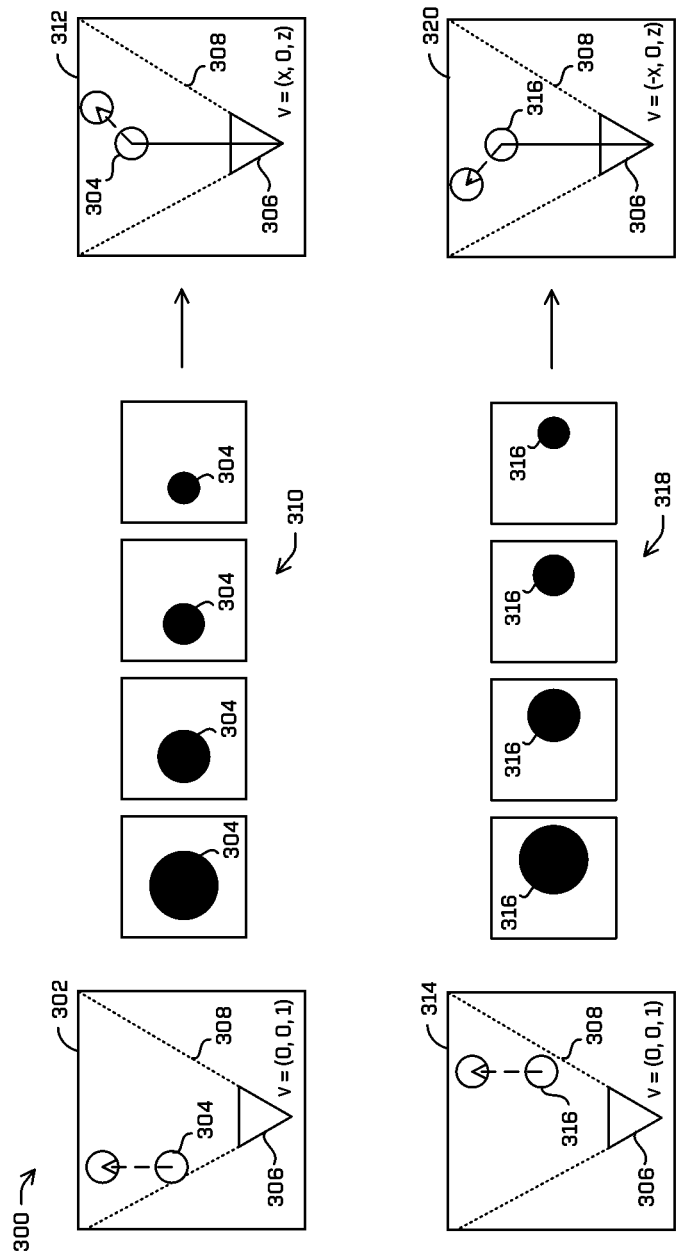
FIG. 3 is an example of camera coordinate frame input images that are used to generate transformed images for determining a velocity of an object, in accordance with examples of the disclosure.

FIG. 3 is an example 300 of camera coordinate frame input images that are used to generate transformed images for determining a velocity of an object, in accordance with examples of the disclosure.

An example 302 depicts an object 304 which may be captured by a camera 306 as the object 304 moves through an environment. The object 304 may be captured on a left side of a view frustum 308 of the camera 306, resulting in a sequence of images 310 as the object 304 moves through the environment. In the sequence of images 310, the object 304 appears to be getting "smaller," which may indicate that the object 304 is moving away from the camera 306. With this single perspective, a velocity component may be able to determine a velocity of the object 304 in a camera coordinate frame associated with the view frustum 308 as v=(0, 0, 1), as shown. In other words, the velocity of the object 304 in this example 302 has only a z-component, in a camera coordinate frame where positive x-direction extends to the right of the optical center of the camera, positive y-direction extends down from the optical center of the camera, and positive z-direction extends forward from the optical center of the camera.

Utilizing the described techniques, a first image of the sequence of images 310 may be used to generate a sequence of transformed images in a transformed space, such as by rotating the first image such that the object 304 is positioned in an image center and then rotating the additional image(s) in the sequence by the same amount. The transformed images may be used to determine a ROV of the object 304 in the transformed space, as depicted in an example 312. In at least some examples, the ROV of the object in the transformed space is determined by inputting the sequence of images 310 into a machine learned model trained to determine an ROV in an image plane, such as according to the discussion of FIG. 2. In this case, the ROV of the object 304 in the transformed space has a velocity in two components, v=(x, 0, z). Therefore, the transformed space 312 provides an additional perspective of the object 304 is it moves through the environment, without necessitating another camera to capture the object 304.

Additionally, an example 314 depicts an object 316 captured by the camera 306 as the object 316 moves through the environment. In this case, the object 316 may be captured on a right side of the view frustum 308 of the camera 306, resulting in a sequence of images 318 as the object 316 moves through the environment. In the sequence of images 318, the object 316 also appears to be getting "smaller," which may indicate that the object 316 is moving away from the camera 306. With this single perspective, a velocity component may be able to determine a velocity of the object 316 in a camera coordinate frame associated with the view frustum 308 as v=(0, 0, 1), as shown. Thus, the velocity of the object 316 in this example 314 has only a z-component, and is equal to the velocity determined in the example 302, despite the objects 304 and 316 being in different locations of the view frustum 308, and potentially having different sizes and/or different actual velocities. Without an additional perspective, this may result in difficulties when making predictions about the movement of the objects 304 and 316, determining a trajectory of a vehicle, and so forth.

However, similar to the above description, a first image of the sequence of images 318 may be used to generate a sequence of transformed images in a transformed space, such as by rotating the first image such that the object 316 is positioned in an image center and then rotating the additional image(s) in the sequence by the same amount. The transformed images may be used to determine a ROV of the object 316 in the transformed space, as depicted in an example 320. In at least some examples, the ROV of the object in the transformed space is determined by inputting the sequence of images 318 into a machine learned model trained to determine an ROV in an image plane, such as according to the discussion of FIG. 2. In this case, the ROV of the object 316 in the transformed space also has a velocity in two components, v=(−x, 0, z). Similar to the above description, the transformed space 320 provides an additional perspective of the object 316 is it moves through the environment, without necessitating another camera to capture the object 316. Furthermore, the additional perspective supplied by the transformed space 320 differentiates the velocity of the object 316 from the object 304 (e.g., a positive x component for object 304, and a negative x component for object 316), which would otherwise be the same velocity without the transformation applied to the sequences of images 310 and 318.

Figure 4:
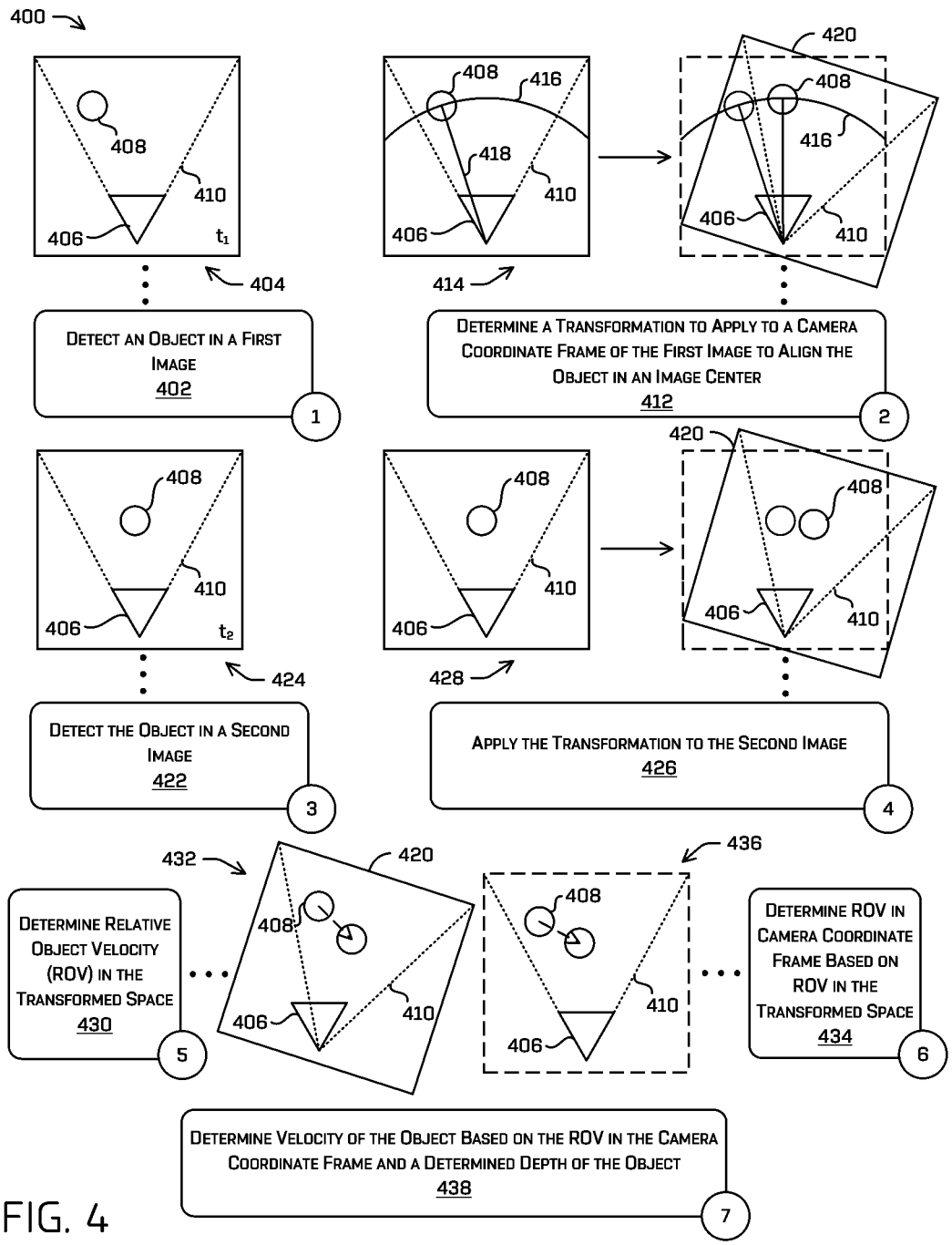
FIG. 4 is a pictorial flow diagram for determining a relative object velocity (ROV) in a transformed space, and using the ROV in the transformed space to determine a velocity of the object in the real world based on applying the ROV in the transformed space to a camera coordinate frame, in accordance with examples of the disclosure.

FIG. 4 is a pictorial flow diagram 400 for determining a relative object velocity (ROV) in a transformed space, and using the ROV in the transformed space to determine a velocity of the object in the real world based on applying the ROV in the transformed space to a camera coordinate frame, in accordance with examples of the disclosure. In some examples, one or more of the steps depicted in the pictorial flow diagram 400 may be executed during training of a machine learned model in order to train the model to determine a ROV of an object in an image plane. Alternatively or additionally, one or more of the steps depicted in the pictorial flow diagram 400 may be executed in reverse (e.g., last step to first step) by a velocity component to determine a ROV of an object in an image plane from a ROV of the object in a transformed space received from a machine learned model.

An operation 402 (indicated by "1") includes detecting an object in a first image. For example, an example 404 includes a camera 406 which may be used to obtain an image of an object 408 in an environment at time $t_1$. The camera 406 may have an associated view frustum 410 indicating the region of the environment that may appear in an image captured by the camera 406. The example 404 is not itself the image captured by the camera 406, but rather a top-down representation of the environment that includes both the camera 406 and the object 408 within the view frustum 410. The location of the object 408 in the first image as described by the operation 402 may be represented in coordinates associated with an image plane of the image captured at time $t_1$.

An operation 412 (indicated by "2") includes determining a transformation to apply to a camera coordinate frame of the first image to align the object in an image center. For instance, an example 414 may correspond to the example 404, while further including an arc 416 centered at the optical center of the camera 406. A radius 418 extends from the optical center of the camera 406 to the center of the object 408 on the arc 416. The arc 416 indicates a visual reference for a path that may be used to align the object 408 with the optical center of the camera 406, and may not necessarily be part of the transformation itself. The transformation may be determined by rotating the object 408 about the optical center of the camera 406 along the arc 416, until the object 408 is aligned with the center of the view frustum of the camera 406. A transformed space 420 created by the transformation depicts a rotation of the view frustum 410 as the object 408 rotates along the arc 416 to align with the optical center of the camera 406. The transformation may include a rotation in degrees, radians, etc. and/or a translation to bring the object 408 to the optical center of the camera 406. In some examples, the transformation may be achieved by rotating the camera coordinate frame of the camera 406, according to the following:

$$R(p_0) = \frac{1}{\|(1, p_0)\|} \begin{bmatrix} 1 & -p_0 \\ p_0 & 1 \end{bmatrix} = \frac{1}{\left\|\left(1, \frac{P_{0,x}}{P_{0,z}}\right)\right\|} \begin{bmatrix} 1 & -\frac{P_{0,x}}{P_{0,z}} \\ \frac{P_{0,x}}{P_{0,z}} & 1 \end{bmatrix}$$

The right side of the equation above corresponds to a frustum of the camera used to capture an image, and operates in image coordinates of the image based on the 2×2 matrix shown. Because the object is being rotated in the image plane that is two dimensional, only x- and z-directions are described here, but examples are contemplated in which rotations are applied in three (or more) dimensions, such as by utilizing a 3×3 matrix. In the equation above, $P_{0,x}$ corresponds to a location of the object at the beginning of the object trajectory in the x-direction (e.g., in the first image of the sequence), and $P_{0,z}$ corresponds to a location of the object at the beginning of the object trajectory in the z-direction. Solving for $R(p_0)$ provides the rotation to center the object in the optical center of the camera.

An operation 422 (indicated by "3") includes detecting the object in a second image. For example, an example 424 includes the camera 406 which may be used to obtain an image of the object 408 in the environment at time $t_2$. The example 424 includes the view frustum 410 indicating the top-down view of the environment that may appear in an image captured by the camera at time $t_2$.

An operation 426 (indicated by "4") includes applying the transformation to the second image. In some examples, the same or similar transformation that was applied to the first image is applied to the second image (e.g., $R(p_0)$ from the equation above), and any additional images in a sequence. For example, an example 428 depicts the transformation determined in operation 412 to the transformed space 420 where the view frustum 410 was rotated to. As the view frustum 410 is rotated from the image captured at time $t_2$, the object 408 also moves in the transformed space 420. However, the object 408 rotates by a different amount in the example 428. Thus, the transformed space 420 creates a different perspective on the movement of the object 408 from time $t_1$ to time $t_2$ to use in determining a velocity of the object 408, without requiring an additional camera to capture images of the object 408. A transformed image generated based on the transformation determined in operation 412 and a transformed image generated based on the transformation applied in operation 426 results in the sequence of transformed images which may be input into a machine learned model to determine a ROV of the object in the transformed space 420. In at least some examples, crops of the transformed images corresponding to the object (which may be resized to a constant size) may be input into the machine learned model. Of course, any number of images may make up the sequence of transformed images, such as by repeating the operation 426 on additional images received from the camera 406. In examples, the transformation is stored to determine a ROV of the object 408 in the camera coordinate frame when the ROV of the object 408 in the transformed space 420 is received from the machine learned model.

An operation 430 (indicated by "5") includes determining a relative object velocity (ROV) in the transformed space. In some examples, the ROV in the transformed space is determined by inputting the sequence of transformed images into a machine learned model trained to determine ROV in an image plane, and receiving a ROV of the object in the transformed space from the machine learned model. An example 432 depicts the transformed space 420 including the change in location of the object 408 that occurred from time $t_1$ to time $t_2$ in the transformed space 420. The ROV of the object 408 in the transformed space may be expressed in image coordinates divided by time, or a normalized unit divided by time, e.g., (0, 0.5/s, 0.5/s). In some examples, the ROV may be dependent upon the time between the first image being captured at time $t_1$ and the second image being captured at time $t_2$.

An operation 434 (indicated by "6") includes determining a ROV in the camera coordinate frame based on the ROV in the transformed space. In some examples, the ROV in the camera coordinate frame may be determined by applying the inverse transformation that was applied to align the location of the object with the image center in the operation 412. An example 436 depicts the object 408 in the original camera coordinate frame, including the change in the location of the object 408 from time $t_1$ to time $t_2$. The ROV in the camera coordinate frame may be obtained by applying an inverse of the transformation (e.g., rotation) to the ROV in the transformed space described in image coordinates divided by time, resulting in a velocity in image coordinates divided by time rotated back to the camera coordinate plane.

An operation 438 (indicated by "7") includes determining a velocity of the object based on the ROV in the camera coordinate frame and a determined depth of the object. As noted above, the ROV in both the transformed space 420 and the ROV in the camera coordinate frame may be in image coordinates divided by time, where the distance to the object 408 from the camera 406 is otherwise unknown. Therefore, a depth associated with an image in the sequence of images may be obtained to apply to the ROV in the camera coordinate frame to determine an actual velocity of the object 408 in the environment. The depth of the object 408 may be determined in a variety of ways. For example, the depth of the object 408 may be determined using a known size of a reference feature of the object 408. For example, if a known size of a wheelbase (or other feature, e.g., mirror size, steering wheel size, windshield size, etc.) of particular type of vehicle is known, the difference between the known size of the feature and the size of the feature as appearing in the image may be leveraged to determine a distance from the camera 406. In another example, lidar detections obtained by sensors proximate the camera 406 may be used to determine a distance of the object 408 from the camera 406. In other examples, contact points may be leveraged to determine a distance of the object 408 from the camera 406.

For instance, a ray may be unprojected onto a three-dimensional surface mesh of the environment, and an intersection point between the ray and the three-dimensional surface mesh (e.g., a map) can be used as an estimate for the projected location of the object contact point. Additional details regarding utilizing contact points to determine depth of an object can be found in U.S. patent application Ser. No. 15/814,870, which is incorporated by reference herein in its entirety. Other examples of determining depth of the object 408 in the environment are also considered.

Once the depth of the object 408 is obtained, an actual velocity of the object 408 in the environment may be determined by multiplying the ROV in the camera coordinate frame by the depth. Multiplying the ROV of the object 408 in the camera coordinate frame by the depth of the object 408 transitions the velocity in image coordinates divided by time to an actual distance divided by time, e.g., meters/second, miles/hour, and so forth, depending on the units used to determine the depth of the object. The actual velocity may correspond to an actual velocity from time $t_1$ to time $t_2$, and/or may correspond to a time elapsed from a first image used in the sequence of images to a last image used in the sequence of images.

In some cases, the camera 406 may be itself moving, such as the case with a camera positioned upon an autonomous vehicle (or other type of vehicle). When the camera 406 is moving, it may be desirable to obtain an actual velocity of the object 408 independent of the motion of the camera 306. Therefore, the velocity of the camera 406 may be added to the actual velocity of the object 408 to determine the actual velocity of the object 408 independent of the velocity of the camera 406. For instance, the velocity of the camera 406 in an x-direction may be added to the velocity of the object 408 in the x-direction, the velocity of the camera 406 in ay-direction may be added to the velocity of the object 408 in the y-direction, and the velocity of the camera 406 in a z-direction may be added to the velocity of the object 408 in the z-direction, to arrive at a velocity of the object 408 independent of the velocity of the camera 406.

Figure 5:
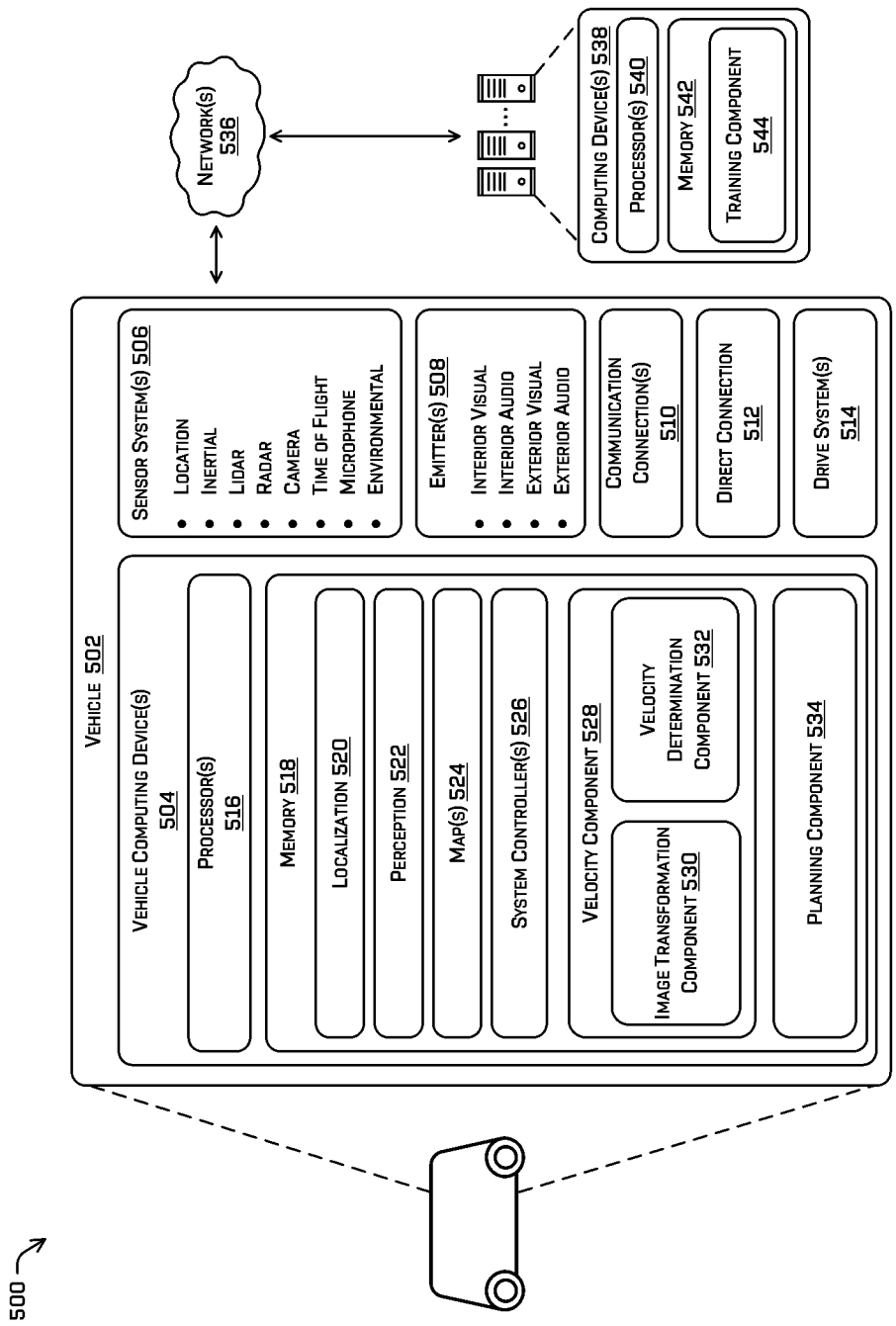
FIG. 5 depicts a block diagram of an example system for implementing the techniques described herein.

FIG. 5 depicts a block diagram of an example system 500 for implementing the techniques described herein. In at least one example, the system 500 can include a vehicle 502, such as an autonomous, semi-autonomous, or manually controlled vehicle.

The vehicle 502 can include vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more maps 524, one or more system controllers 526, a velocity component 528, an image transformation component 530, velocity determination component 532, and a planning component 534. Though depicted in FIG. 5 as residing in the memory 518 for illustrative purposes, it is contemplated that the localization component 520, the perception component 522, the one or more maps 524, the one or more system controllers 526, the velocity component 528, the image transformation component 530, the velocity determination component 532, and the planning component 534 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory, for determining to retrieve map data, and/or determining a speed of the vehicle 502 when a sequence of images is captured for determining a velocity of an object, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 524 can include at least one map (e.g., images and/or a mesh). In some examples, the vehicle 502 can be controlled based at least in part on the maps 524. That is, the maps 524 can be used in connection with the localization component 520, the perception component 522, the velocity component 528, or the planning component 534 to determine a location of the vehicle 502, identify objects in an environment, and/or generate routes and/or trajectories to navigate within an environment.

In some examples, the one or more maps 524 can be stored on a remote computing device(s) (such as the computing device(s) 538) accessible via network(s) 536. In some examples, multiple maps 524 can be stored based on, for example, a characteristic (e.g., type of entity, time of day, day of week, season of the year, etc.). Storing multiple maps 524 can have similar memory requirements, but increase the speed at which data in a map can be accessed.

In some examples, the one or more maps 524 can store sizes or dimensions of objects associated with individual locations in an environment. For example, as the vehicle 502 traverses the environment and as maps representing an area proximate to the vehicle 502 are loaded into memory, one or more sizes or dimensions of objects associated with a location can be loaded into memory as well. In some examples, a known size or dimension of an object at a particular location in the environment may be used to determine a depth of a dynamic object relative to the vehicle 502 when determining a velocity of the dynamic object.

In general, the velocity component 528 can determine velocity of objects in the environment based on data provided by the sensor system(s) 506. In some instances, the velocity component 528 can provide velocity information generated by the image transformation component 530 and/or the velocity determination component 532 to the planning component 534 to determine when and/or how to control the vehicle 502 to traverse an environment. As discussed herein, the velocity component 528 can receive image data, map data, lidar data, and the like to determine velocity-related information about objects in an environment.

The image transformation component 530 included in the velocity component 528 receives images, such as from a camera of the sensor system 506, and generates transformed images in a transformed space based on a location of an object in the images relative to the camera that captured the original images. As discussed herein, the image transformation component 530 may generate a transformed image by rotating a first image of a sequence of images such that an object in the sequence of images aligns with a center of the image plane. The image transformation component 530 may then similarly generate transformed images in the transformed space from any additional images in the sequence by applying the same transformation.

The velocity determination component 532 can determine, from the sequence of transformed images, a first ROV of the object in the transformed space. In some examples, the ROV in the transformed space is determined by inputting the sequence of transformed images into a machine learned model trained to determine ROV in an image plane, and receiving a ROV of the object in the transformed space from the machine learned model. For example, the first ROV may be based on points in the image plane, as previously described. The velocity determination component 532 may use the first ROV and the transformation applied to the sequence of images received from the camera to determine a second ROV of the object in the camera coordinate frame. The velocity determination component 532 may then determine a depth of the object, such as using a known size or dimension of a reference object in the map 524, using a known size of a feature of the object as a reference feature (e.g., a wheelbase of a vehicle, a head size of a pedestrian, etc.), information received from lidar and/or radar of the sensor systems 506, and so forth. The velocity determination component 532 may determine a velocity of the object in the environment using the second ROV and the depth of the object. Further, the velocity determination component 532 may refine the velocity of the object in the environment by accounting for a velocity of the vehicle 502, such as by applying information received from the drive system 514 and/or the localization component 520 regarding a speed of the vehicle 502 at the time the images are captured. In some examples, the velocity determination component 532 can provide information regarding a velocity of an object to the planning component 534 to use in controlling the vehicle 502.

In general, the planning component 534 can determine a path for the vehicle 502 to follow to traverse the environment. For example, the planning component 534 can determine various routes and trajectories and various levels of detail. For example, the planning component 534 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 534 can generate an instruction for guiding the autonomous vehicle along at least a portion of the route from the first location to the second location. In at least one example, the planning component 534 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 534 can generate one or more trajectories for the vehicle 502 based at least in part on the knowledge of velocities of objects in the environment, as discussed herein. In some examples, the planning component 534 can use temporal logic, such as linear temporal logic and/or signal temporal logic, to evaluate one or more trajectories of the vehicle 502.

In at least one example, the vehicle computing device(s) 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

As can be understood, the components discussed herein (e.g., the localization component 520, the perception component 522, the one or more maps 524, the one or more system controllers 526, the velocity component 528, the image transformation component 530, the velocity determination component 532, and the planning component 534) are described as divided for illustrative purposes. However, the operations performed by the various components can be combined or performed in any other component. By way of example, velocity determination functions may be performed by the perception component 522 (e.g., rather than the velocity determination component 532) to reduce the amount of data transferred by the system.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 536, to the one or more computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 536. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more maps 524, the one or more system controllers 526, the velocity component 528, the image transformation component 530, the velocity determination component 532, and the planning component 534 can process sensor data, as described above, and can send their respective outputs, over the one or more network(s) 536, to one or more computing device(s) 538. In at least one example, the localization component 520, the perception component 522, the one or more maps 524, the one or more system controllers 526, the velocity component 528, the image transformation component 530, the velocity determination component 532, and the planning component 534 can send their respective outputs to the one or more computing device(s) 538 at a particular frequency, after a lapse of a predetermined period of time, in near real-time, etc.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a training component 544.

In some instances, the training component 544 can include functionality to train one or more models to determine object locations and/or trajectories, determine types of objects, determine velocities of objects of the object type, and the like. In some instances, the training component 544 can communicate information generated by the one or more models to the vehicle computing device(s) 504 to revise how to control the vehicle 502 in response to different situations. In some examples, historical sensor data of known relative object velocities in an image plane may be leveraged to use as ground truth data for the machine learned model. For instance, training data for the machine learned model may be generated based on historical sensor data from one or more perception logs (e.g., by the perception component 522) or other sources of historical sensor data. The training data may be generated by associating historical image data and based on other historical sensor data indicating the actual measured speed and trajectory of objects depicted in images. The historical sensor data may include or be based at least in part on historical lidar data, radar data, image data, time of flight data, or combinations of these or other sensor modalities. The historical sensor data may include track data describing the tracks of one or more objects sensed in the environment of the vehicle 502. For instance, an image depicting a pedestrian traveling in a particular direction can be labeled with the actual measured speed and/or trajectory of the pedestrian at the time that the image was captured (e.g., as may be provided by the tracking information, radar returns, or the like associated with the pedestrian in the image) and/or at a time following the time at which the image was captured. This labeling can be performed for some or all of the images depicting objects to generate training data which can be used to train a neural network or other machine learned model. Based on this training data, the machine learned model may be trained to detect and/or predict motion (e.g., speed and/or trajectory) of an object in an image plane.

For instance, aspects of some or all of the components discussed herein can include any models, algorithms, and/or machine learning algorithms. For example, in some instances, the components in the memory 542 (and the memory 518, discussed above) can be implemented as a neural network. In some examples, the training component 544 can utilize a neural network to generate and/or execute one or more models to improve various aspects of velocity determinations for use in trajectory planning.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 516 of the vehicle 502 and the processor(s) 540 of the computing device(s) 538 can be any suitable processor capable of executing instructions to process data and perform operations as described herein. By way of example and not limitation, the processor(s) 516 and 540 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa. Further, aspects of the velocity component 528 and/or the planning component 534 can be performed on any of the devices discussed herein.

Figure 6:
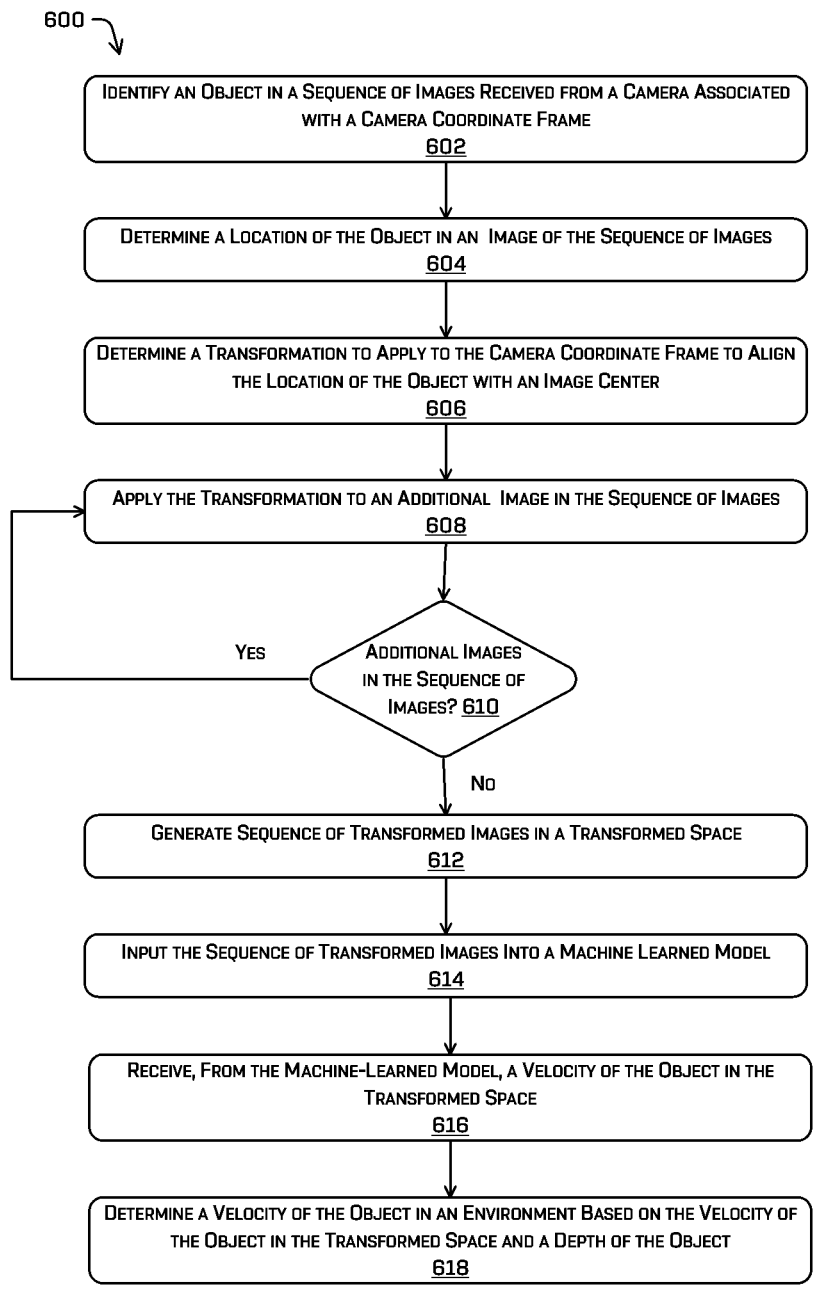
FIG. 6 depicts an example process for transforming a sequence of images to a transformed space, inputting the sequence of transformed images into a machine learned model, receiving a velocity of the object in the transformed space, and determining a velocity of the object in an environment based on the velocity of the object in the transformed space and a depth of the object, in accordance with examples of the disclosure.

FIG. 6 depicts an example process 600 for determining a first ROV of an object in a transformed space, determining a second ROV for the object in a camera coordinate frame based on a transformation of an image to align the object with an image center and the first ROV, and determining a velocity of the object in an environment based on the second ROV and a depth of the object, in accordance with examples of the disclosure. For example, some or all of the process 600 can be performed by one or more components in FIG. 5, as described herein. For example, some or all of the process 600 can be performed by the vehicle computing device(s) 504. Further, any of the operations described in the example process 600 may be executed in parallel, in a different order than depicted in the process 600, omit any of the operations of the depicted process 600, and the like.

At operation 602, the process can include identifying an object in a sequence of images received from a camera associated with a camera coordinate frame. For example, the camera may be included as a sensor on an autonomous vehicle traversing an environment. The camera may capture images of the surrounding environment, including moving and/or stationary objects. The camera coordinate frame may be centered at an optical center of the camera, with the negative z axis projected into the view frustum of the camera from the optical center.

At operation 604, the process can include determining a location of the object in an image of the sequence of images. The location of the object in the image may be indicated in a projected image plane relative to the camera.

At operation 606, the process can include determining a transformation to apply to the camera coordinate frame to align the location of the object with an image center. In some examples, the transformation is one or more of a rotation and/or translation of the camera extrinsics that causes a center of the object to align with a center of a view frustum of the camera (e.g., the negative z axis described in operation 602). In at least some examples, such an image transformation may further comprise unprojection and reprojection operations and be further based at least in part on intrinsics associated with the image sensor (center, focal length, lens distortion models, etc.).

At operation 608, the process can include applying the transformation to an additional image in the sequence of images. For instance, the same rotation and/or translation that was applied to the camera extrinsics of the first image resulting in the object center aligning with the center of the view frustum may be used to rotate and/or translate the additional image in the sequence.

At operation 610, the process can include determining whether there are additional images in the sequence of images. While in some cases only two images are needed to determine a velocity of the object in the environment, additional images may be used to improve accuracy of the velocity of the object, determine how the velocity of the object changes over time, and so forth. If additional images are included in the sequence and it is determined that the additional images should be evaluated, the process can include returning to operation 608, where the same transformation that was applied to the first image resulting in the object center aligning with the center of the view frustum may be used to transform the additional image(s) in the sequence.

If no additional images are to be analyzed in the sequence of images, at operation 612 the process can include generating a sequence of transformed images in a transformed space. The transformed images may be based on the transformation applied to the image and any additional images that include the object. The transformed space may include a coordinate frame applied to the image plane of the transformed images.

At operation 614, the process can include inputting the sequence of transformed images into a machine learned model. At operation 616, the process can include receiving, from the machine learned model, a velocity of the object in the transformed space. In some examples, the sequence of transformed images is input into a machine learned model trained to determine ROV in an image plane, and a ROV of the object in the transformed space is returned from the machine learned model. The ROV may be non-metric (e.g., 1/s, 1/min, etc.), as a depth in the transformed space of the object from the camera may be unknown.

At operation 618, the process can include determining a velocity of the object in an environment based on the velocity of the object in the transformed space and a depth of the object. An ROV in the camera coordinate plane may be determined by applying an inverse of the transformation applied to the sequence of images. The depth of the object may be obtained in a variety of ways, such as by leveraging a known size of a feature of the object (e.g., a wheelbase of a vehicle, a head size of a pedestrian, etc.), utilizing information received from lidar and/or radar, and so forth. The depth of the object can be determined in the camera coordinate frame, and applied to the ROV in the camera coordinate frame, such as by multiplying the depth of the object in any of the images in the sequence by the second ROV to arrive at an actual velocity of the object in the environment. In some cases, as discussed above, a vehicle upon which the camera is located may be moving as well, so actual velocities of the object may be affected by such movement. When this occurs, the velocity of the vehicle may be accounted for (both in magnitude and direction) to determine a velocity of the object independent of the velocity of the vehicle.

EXAMPLE CLAUSES

A: A system comprising: one or more processors; and one or more computer-readable media storing instructions executable by the one or more processors, wherein the instructions, when executed, cause the system to perform operations comprising: receiving a sequence of images of an environment from a camera, the camera associated with a camera coordinate frame; identifying an object depicted in an image of the sequence of images; determining a location of the object in the image; determining a transformation to apply to the camera coordinate frame to align the location of the object with an image center; transforming, based at least in part on the transformation, the sequence of images to a sequence of transformed images in a transformed space; inputting the sequence of transformed images into a machine learned model; receiving, from the machine learned model, a velocity of the object in the transformed space; determining a depth of the object in the camera coordinate frame; and determining, based at least in part on the depth of the object and the velocity of the object in the transformed space, a velocity of the object in the environment.

B: The system of paragraph A, wherein the machine learned model is trained based on an object type of the object and velocities of objects of the object type, and wherein the velocity of the object in the transformed space is further based on the object type.

C: The system of either paragraph A or B, wherein the velocity of the object in the environment is relative to the system, the operations further comprising determining a velocity of the object independent of the system.

D: The system of any one of claims A-C, wherein determining the velocity of the object in the environment further comprises mapping a component of the velocity of the object in the transformed space to the camera coordinate frame.

E: The system of paragraph D, wherein the location of the object in the image is represented as a center of a view frustum of the transformed space.

F: A method comprising: receiving an image depicting an object, the image received from an image capture device having a camera coordinate frame; applying a transformation to the camera coordinate frame of the image capture device to align a center of the object with an image center to generate a transformed image in a transformed space; inputting the transformed image into a machine learned model; receiving, from the machine learned model, a velocity of the object in the transformed space; determining a depth of the object in the camera coordinate frame; and determining, based at least in part on the depth of the object and the velocity of the object in the transformed space, a velocity of the object in an environment.

G: The method of paragraph F, wherein the image is a first image and the transformed image is a first transformed image, the method further comprising: receiving a second image depicting the object, the second image associated with the camera coordinate frame; generating, based at least in part on the transformation, a second transformed image in the transformed space; inputting the second transformed image into the machine learned model, wherein the velocity of the object in the transformed space received from the machine learned model is further based on the second transformed image.

H: The method of either paragraph F or G, wherein determining the velocity of the object in the environment further comprises mapping a component of the velocity of the object in the transformed space to the camera coordinate frame.

I: The method of any one of claims F-H, wherein the machine learned model is trained based on an object type of the object and velocities of objects of the object type, and wherein the velocity of the object in the transformed space is further based on the object type.

J: The method of any one of claims F-I, wherein the image is captured by a camera of a vehicle traversing the environment.

K: The method of paragraph J, wherein the velocity of the object in the environment is relative to a speed of the vehicle at a time that the image was captured, the method further comprising determining a velocity of the object independent of the speed of the vehicle.

L: The method of any one of claims F-K, wherein the velocity of the object comprises a velocity in at least two different directions of the environment.

M: The method of any one of claims F-L, wherein the depth of the object is determined based at least in part on one or more of a detected contact point of the object with a ground, lidar data associated with the depth of the object, or a reference object associated with the object.

N: A vehicle comprising: a camera; one or more processors; and one or more computer-readable media storing instructions executable by the one or more processors, wherein the instructions, when executed, cause the one or more processors to perform operations comprising: receiving, from the camera, an image depicting an object, the camera associated with a camera coordinate frame; determining a transformation to apply to the camera to align a center of the object with an image center; generating, based at least in part on the transformation, a transformed image in a transformed space, the transformed image having the center of the object aligned with the image center; inputting the transformed image into a machine learned model, receiving, from the machine learned model, a velocity of the object in the transformed space.

O: The vehicle of paragraph N, wherein a location of the object in the image is represented as a center of a view frustum of the transformed space.

P: The vehicle of either paragraph N or O, wherein the image is a first image and the transformed image is a first transformed image, the operations further comprising: receiving, from the camera, a second image depicting the object, the second image associated with the camera coordinate frame; generating, based at least in part on the transformation, a second transformed image in the transformed space; and inputting the second transformed image into the machine learned model, wherein the velocity of the object in the transformed space received from the machine learned model is further based on the second transformed image.

Q: The vehicle of paragraph P, wherein generating the first transformed image comprises: determining a frustum associated with one or more of a rotation or translation of the camera coordinate frame; determining an image plane associated with the frustum; and transferring, as the transformed image, the rotation or translation of the image to the image plane.

R: The vehicle of any one of claims N-Q, wherein the machine learned model is trained based at least in part on an object type of the object and velocities of objects of the object type.

S: The vehicle of paragraph R, wherein the object type corresponds to one or more of: a vehicle; a bicycle; or a pedestrian.

T: The vehicle of any one of claims N-S, wherein the velocity of the object in the environment is relative to a speed of the vehicle at a time that the image was captured, the operations further comprising determining a velocity of the object independent of the speed of the vehicle.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
   receiving an image representing at least a portion of an object, the image associated with a camera coordinate frame;
   applying a transformation to align a feature of the object with a location in an image space to generate a transformed image in a transformed space, wherein a location of the at least the portion of the object in the image is represented as a center of a view frustum of the transformed space;
   determining a velocity of the object in the transformed space;
   determining a depth of the object in the camera coordinate frame; and
   determining, based at least in part on the depth of the object and the velocity of the object in the transformed space, a velocity of the object in an environment.

2. The system of claim 1, wherein the velocity of the object in the environment is a first velocity relative to the system and the operations further comprise determining a second velocity of the object, the second velocity independent to a velocity of the system.

3. The system of claim 1, wherein determining the velocity of the object in the environment further comprises mapping a component of the velocity of the object in the transformed space to the camera coordinate frame.

4. The system of claim 1, wherein the image representing the at least the portion of the object is a first image and the transformed image is a first transformed image, and the operations further comprise:

receiving a second image depicting the at least the portion of the object, the second image associated with the camera coordinate frame; and generating, based at least in part on the transformation, a second transformed image in the transformed space, wherein the velocity of the object in the transformed space is further based on the second transformed image.

5. The system of claim 4, wherein generating the first transformed image comprises:

determining a first frustum associated with one or more of a rotation or translation of the camera coordinate frame;

determining an image plane associated with the first frustum; and transferring, as the transformed image, the rotation or translation of the image representing the at least the portion of the object to the image plane.

6. The system of claim 1, wherein the image representing the at least the portion of the object is captured by a camera of a vehicle traversing the environment.

7. The system of claim 1, wherein the velocity of the object comprises a first velocity component in a first direction of the environment and a second velocity component in a second direction of the environment, the first direction being different from the second direction.

8. The system of claim 1, wherein the depth of the object is determined based at least in part on one or more of a detected contact point of the object with a ground, lidar data associated with the depth of the object, or a reference object associated with the object.

9. A method comprising:

receiving an image representing at least a portion of an object, the image associated with a camera coordinate frame;

applying a transformation to align a feature of the object with a location in an image space to generate a transformed image in a transformed space, wherein a location of the at least the portion of the object in the image is represented as a center of a view frustum of the transformed space;

determining a velocity of the object in the transformed space;

determining a depth of the object in the camera coordinate frame; and determining, based at least in part on the depth of the object and the velocity of the object in the transformed space, a velocity of the object in an environment.

10. The method of claim 9, wherein the image representing the at least the portion of the object is a first image and the transformed image is a first transformed image, the method further comprising:

receiving a second image depicting the at least the portion of the object, the second image associated with the camera coordinate frame; and generating, based at least in part on the transformation, a second transformed image in the transformed space, wherein the velocity of the object in the transformed space is further based on the second transformed image.

11. The method of claim 9, wherein determining the velocity of the object in the environment further comprises mapping a component of the velocity of the object in the transformed space to the camera coordinate frame.

12. The method of claim 9, wherein the image representing the at least the portion of the object is captured by a camera of a vehicle traversing the environment.

13. The method of claim 12, wherein the velocity of the object in the environment is a first velocity relative to the vehicle at a time that the image representing the at least the portion of the object was captured, the method further comprising determining a second velocity of the object, the second velocity of the object independent to a velocity of the vehicle.

14. The method of claim 9, wherein the velocity of the object comprises a first velocity component in a first direction of the environment and a second velocity component in a second direction of the environment, the first direction being different from the second direction.

15. The method of claim 9, wherein the depth of the object is determined based at least in part on one or more of a detected contact point of the object with a ground, lidar data associated with the depth of the object, or a reference object associated with the object.

16. The method of claim 9, wherein generating the transformed image comprises:

determining a first frustum associated with one or more of a rotation or translation of the camera coordinate frame;

determining an image plane associated with the first frustum; and transferring, as the transformed image, the rotation or translation of the image representing the at least the portion of the object to the image plane.

17. A vehicle comprising:

a camera;

one or more processors; and one or more computer-readable media storing instructions executable by the one or more processors, wherein the instructions, when executed, cause the one or more processors to perform operations comprising:

receiving an image representing at least a portion of an object, the image associated with a camera coordinate frame;

applying a transformation to align a feature of the object with a location in an image space to generate a transformed image in a transformed space, wherein a location of the at least the portion of the object in the image being represented as a center of a view frustum of the transformed space;

determining a velocity of the object in the transformed space;

determining a depth of the object in the camera coordinate frame; and determining, based at least in part on the depth of the object and the velocity of the object in the transformed space, a velocity of the object in an environment.

18. The vehicle of claim 17, wherein the image representing the at least the portion of the object is a first image and the transformed image is a first transformed image, the operations further comprising:

receiving a second image depicting the at least the portion of the object, the second image associated with the camera coordinate frame; and generating, based at least in part on the transformation, a second transformed image in the transformed space, wherein the velocity of the object in the transformed space is further based on the second transformed image.

19. The vehicle of claim 18, wherein generating the first transformed image comprises:

determining a first frustum associated with one or more of a rotation or translation of the camera coordinate frame;

determining an image plane associated with the first frustum; and transferring, as the transformed image, the rotation or translation of the image representing the at least the portion of the object to the image plane.

20. The vehicle of claim 17, wherein the velocity of the object in the environment is a first velocity relative to the vehicle at a time that the image representing the at least the portion of the object was captured and the operations further comprise determining a second velocity of the object, the second velocity of the object independent to a velocity of the vehicle.

* * * * *